United States Patent [19]

Huang et al.

[11] Patent Number: 5,566,181
[45] Date of Patent: Oct. 15, 1996

[54] METHOD AND SYSTEM FOR ESTABLISHING A COMMUNICATION USING GEOGRAPHICALLY DISTRIBUTED PACKET DUPLICATORS

[75] Inventors: Hsia Huang; Paul M. Erickson, both of Palatine; Bin Lo, Glen Ellyn, all of Ill.

[73] Assignee: Motorola, Inc., Schaumburg, Ill.

[21] Appl. No.: 564,525

[22] Filed: Nov. 29, 1995

[51] Int. Cl.$^6$ ............................. H04B 7/00; H04L 12/56; H04Q 7/22
[52] U.S. Cl. ......................... 370/94.1; 370/95.1; 379/58; 455/56.1
[58] Field of Search ........................... 370/54, 58.2, 58.3, 370/60, 60.1, 62, 68.1, 94.1, 94.2, 94.3, 97, 95.1, 95.3; 379/58, 59, 63; 455/13.1, 33.1, 53.1, 54.1, 54.2, 56.1

[56] References Cited

U.S. PATENT DOCUMENTS 5,369,781  11/1994  Comroe et al. ...................... 455/56.1
5,387,905  2/1995  Grube et al. ......................... 455/56.1
5,396,643  3/1995  Frenzer et al. ...................... 455/13.1
5,448,758  9/1995  Grube et al. ......................... 455/54.1

Primary Examiner—Hassan Kizou
Attorney, Agent, or Firm—Daniel C. Crilly

[57] ABSTRACT

A radio communication system (200) employs a method (400) and system (200) for establishing a communication between communication units (212–217) using geographically distributed packet duplicators (203–205). The communication system (200) includes a system controller (201), a plurality of packet duplicators (203–205), a plurality of base sites (207–210), and a plurality of communication units (212–217). The packet duplicators (203–205), which provide interconnectivity between the base sites (207–210), are distributed throughout geographic regions (233–234) of the system (200). When the system controller (201) receives a request to communicate from one communication unit (e.g., 212) in a group of communication units (e.g., 212–215), the system controller (201) selects a packet duplicator (e.g., 203) serving a geographic region (e.g., 233) containing at least one communication unit in the group and uses the selected packet duplicator (203) to establish the group communication.

25 Claims, 5 Drawing Sheets

FIG.1 —PRIOR ART—

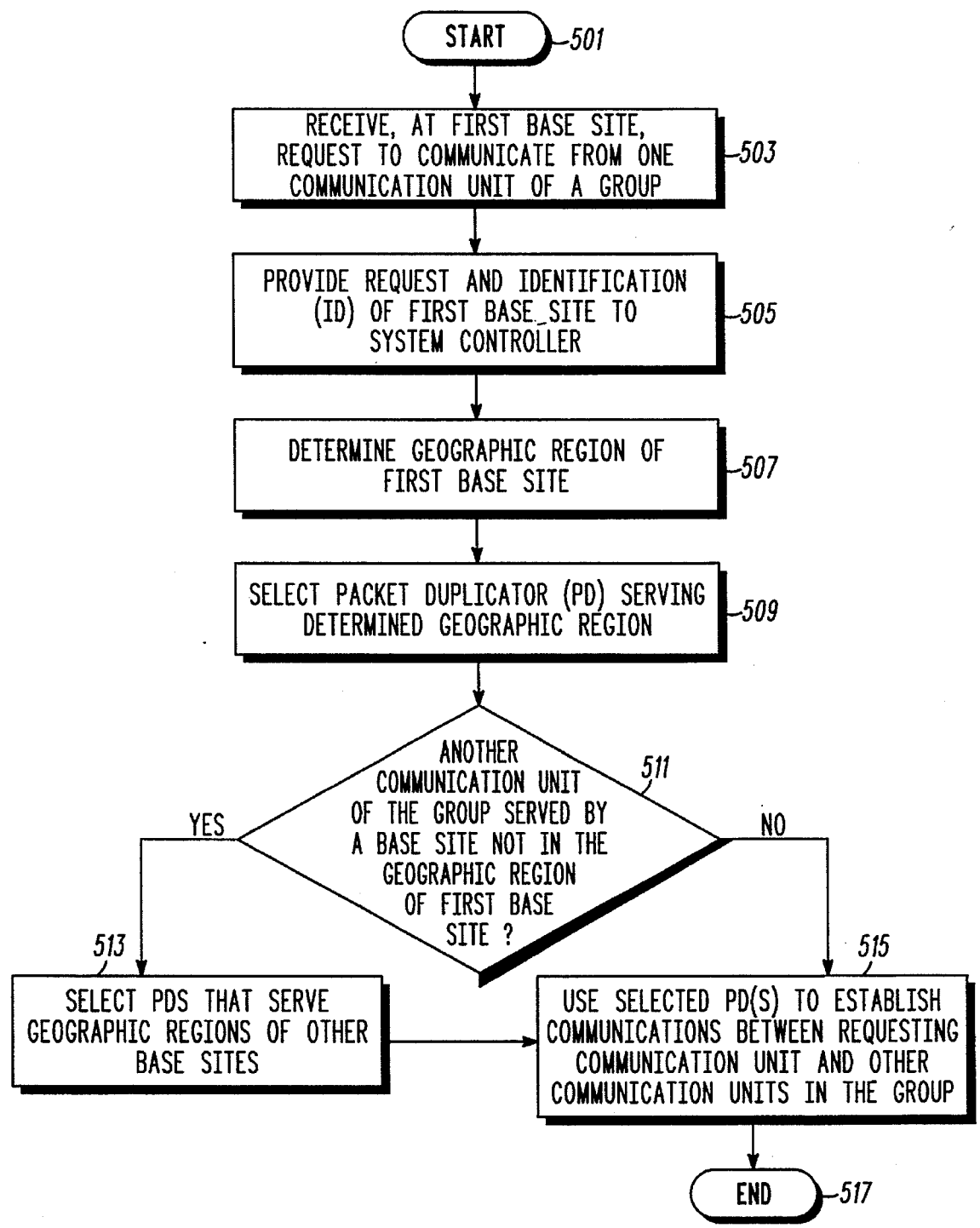

METHOD AND SYSTEM FOR ESTABLISHING A COMMUNICATION USING GEOGRAPHICALLY DISTRIBUTED PACKET DUPLICATORS

FIELD OF THE INVENTION

The present invention relates generally to radio communication systems and, in particular, to a method and system for establishing a communication between communication units using geographically distributed packet duplicators.

BACKGROUND OF THE INVENTION

Radio communication systems are known to include a central controller, a bank of packet duplicators, a plurality of base sites, and a plurality of communication units. Each base site provides communication services to communication units located in its corresponding service coverage area. Each packet duplicator in the packet duplicator bank is coupled to each base site via a respective transmission link to provide interconnectivity between the base sites. In a similar manner, the central controller is coupled to each base site and each packet duplicator in the packet duplicator bank via a respective transmission link. The lengths of the transmission links between the packet duplicators and the base sites correspond to the distance between each base site and the packet duplicator bank.

Operation of the typical radio communication system occurs as follows. When a communication unit, such as a mobile or portable radio, initially desires to communicate with one or more other communication units, the communication unit transmits a channel origination request to a base site over a control channel. The channel request typically includes an identification of the requesting communication unit and identifications of any target communication units. Upon receiving the channel request, the base site forwards the request and an identification of the base site to the central controller. The central controller then assigns a packet duplicator from the packet duplicator bank to support the requested communication. The central controller typically selects the packet duplicator for a particular communication in a round robin manner to equalize the loading of the packet duplicators in the packet duplicator bank.

In addition, the central controller determines the approximate location of each target communication unit by paging each communication unit from one or more base sites. Upon receipt of a page, a target communication unit transmits an acknowledgment to a base site serving the service coverage area containing the responding communication unit. The base site receiving the acknowledgment forwards the acknowledgment and the base site identification to the central controller. By knowing which base site received a particular communication unit's page acknowledgment, the central controller knows which service coverage area the particular communication unit is most likely in and, hence, the particular communication unit's approximate location.

Once the central controller has identified the base sites serving the communication units involved in the requested communication, the central controller instructs each participating base site to allocate a traffic channel for the communication. The base sites then notify their respective communication units of their respective channel assignments and the communication system is ready for the transmission of the communication.

Upon being allocated a traffic channel, the requesting communication unit transmits a voice communication to its serving base site via the allocated traffic channel. The serving base site forwards the voice communication to the assigned packet duplicator in the packet duplicator bank. The packet duplicator replicates the voice communication and provides the replicated communication to all participating base sites via the respective transmission links connecting the packet duplicator to the base sites. Upon receiving the replicated communication, the base sites transmit the replicated communication to their respective communication units via the allocated traffic channels. The conveyance of the communication between the communication units continues in the above manner (i.e., one base site receives the communication and forwards it to the packet duplicator, where the communication is replicated and provided to the base sites via the transmission links ) for the duration of the communication. Upon termination of the communication, the central controller deassigns the packet duplicator and instructs the base sites to deallocate the traffic channels.

Depending on each participating communication unit's location in the system, the packet duplicator may have to convey the replicated communication to base sites via long transmission links. Since the packet duplicator bank is often centrally located in the system, the farther the packet duplicator bank is from the participating communication units, the more likely that long transmission links will have to be used between the packet duplicator bank and the base sites. Thus, if all the participating communication units are located in one or two service coverage areas located at the farthest edge of the system, long transmission links will be used for each conveyance between the serving base sites and the packet duplicator. The frequent use of long transmission links can become very costly for the user of the requesting communication unit or for the system subscriber (e.g., a taxi company) subsidizing the cost of establishing communications between the communication units (e.g., taxis). Similar to the situation in which the cost of making a local call is substantially less than the cost of making a long distance phone call over the public switched telephone network, the cost of establishing communications over short transmission links is substantially less than the cost of establishing communications over long transmission links. Thus, in the typical communication system, group communications involving communication units located a substantial distance away from the packet duplicator bank are, on average, very costly.

Therefore, a need exists for a method and system for establishing a communication between communication units using geographically distributed packet duplicators that utilize, on average, more short transmission links than long transmission links to convey communications between base sites and packet duplicators, thereby providing less costly communications for system users.

BRIEF DESCRIPTION OF THE DRAWINGS

FIG. 5 illustrates a logic flow diagram of steps executed to establish a communication between communication units in accordance with an alternative embodiment of the present invention.

DESCRIPTION OF THE PREFERRED EMBODIMENT

Generally, the present invention encompasses a method and system for establishing a communication between communication units using geographically distributed packet duplicators. A radio communication system includes a system controller, a plurality of packet duplicators, a plurality of base sites, and a plurality of communication units. The plurality of packet duplicators provide interconnectivity between the base sites and are distributed throughout geographic regions of the communication system. When the system controller receives a request to communicate from one communication unit in a group of communication units, the system controller selects a packet duplicator serving a geographic region containing at least one communication unit in the group and uses the selected packet duplicator to establish the communication between the group of communication units (e.g., by providing the communication directly to all base sites supporting the group of communication units or by providing the communication directly to some of the base sites serving the group of communication units and to another packet duplicator serving another geographic region containing some of the communication units in the group).

By establishing the communication between the group of communication units in this manner, the present invention provides, on average, less costly communications than prior an techniques. By selecting a packet duplicator serving the geographic region containing some or all of the communication units in the group, the present invention provides a higher probability of using short transmission links between the selected packet duplicator and the base sites serving the communication than does the round robin selection of a packet duplicator from a single, centralized group of packet duplicators as in the prior art.

Figure 1:
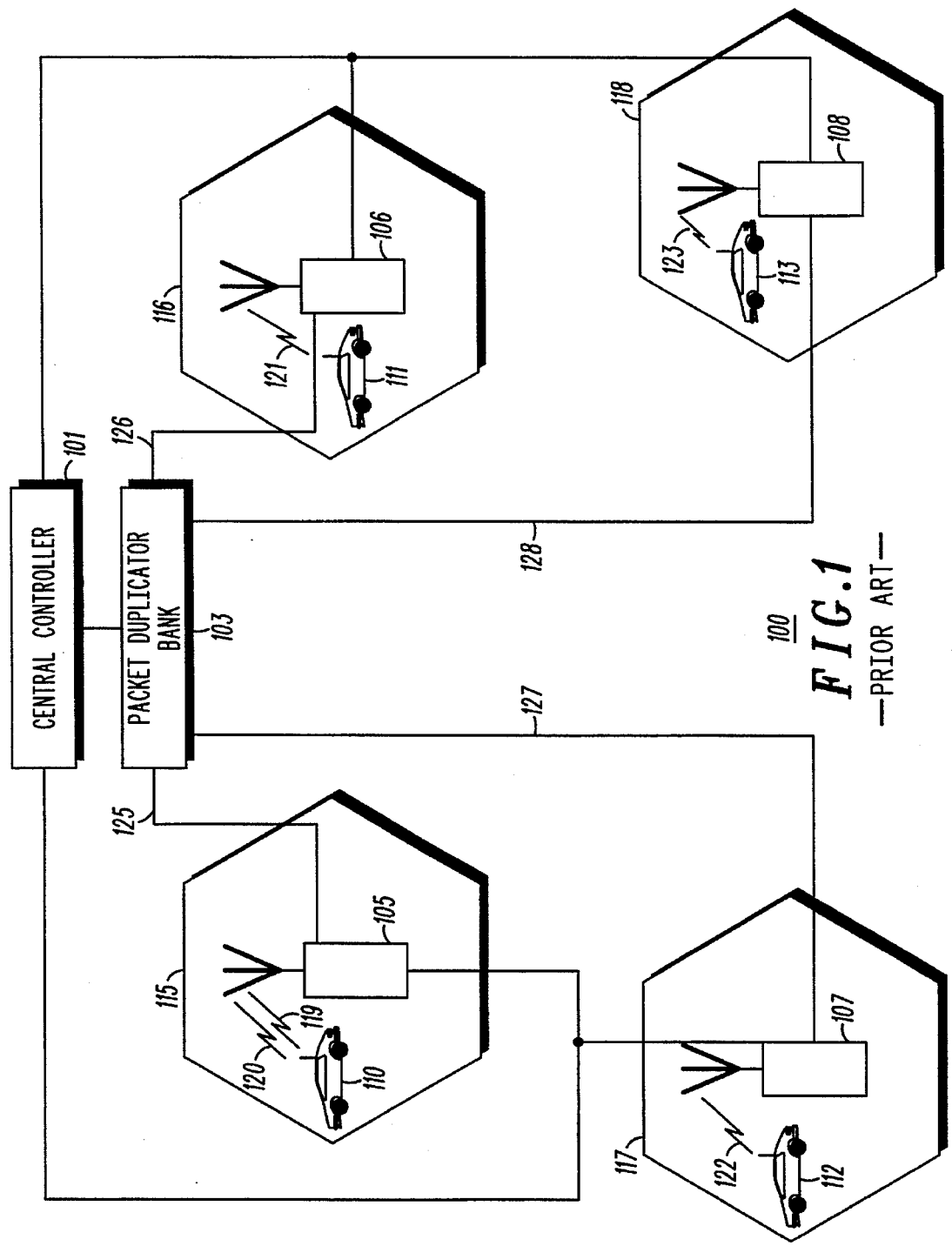
FIG. 1 illustrates a typical radio communication system incorporating packet duplicators.

The present invention can be more fully described with reference to FIGS. 1–5. FIG. 1 illustrates a typical radio communication system 100 incorporating packet duplicators. The radio communication system 100 includes a central controller 101, a bank 103 of packet duplicators, a plurality of base sites 105–108, and a plurality of communication units 110–113. Each packet duplicator in the packet duplicator bank 103 is coupled to each base site 105–108 via a respective transmission link (e.g., 125–128), such as a T1 wireline link. In a similar manner, the central controller 101 is coupled to each base site 105–108 and each packet duplicator in the packet duplicator bank 103 via a respective transmission link. In the typical scenario, the packet duplicator bank 103 and the central controller 101 are centrally located within the communication system 100 and, in some instances, are collocated. Thus, the lengths of the transmission links 125–128 between the packet duplicators and the base sites 105–108 correspond to the distance between each base site 105–108 and the packet duplicator bank 103. As shown, the transmission links 125–126 between the packet duplicator bank 103 and base sites 105–106 are relatively short in length; whereas, the transmission links 127–128 between the packet duplicator bank 103 and base sites 107–108 are relatively long in length.

Each base site 105–108 provides communication services to communication units 110–113 located in its corresponding service coverage area 115–118. As shown in FIG. 1, base site 105 provides communication service to communication units (e.g., 110) located in service coverage area 115; whereas, base site 106 provides communication service to communication units (e.g., 111) located in service coverage area 116. Similarly, base site 107 provides communication service to communication units (e.g., 112) located in service coverage area 117; whereas, base site 108 provides communication service to communication units (e.g., 113) located in service coverage area 118.

Operation of the typical radio communication system 100 occurs substantially as follows. When a communication unit (e.g., 110), such as a mobile or portable radio, desires to communicate with one or more of the other communication units 111–113, the communication unit 110 transmits a channel request to the serving base site 105 (i.e., the base site 105 serving the service coverage area 115 containing the communication unit 110) over a control communication channel 119. The channel request typically includes an identification of the requesting communication unit 110 and identifications of any target communication units 111–113. Upon receiving the channel request, the base site 105 forwards the request and an identification of the base site 105 to the central controller 101. The central controller 101 then assigns a packet duplicator from the packet duplicator bank 103 to support the requested communication. The central controller 101 typically selects the packet duplicator for a particular communication in a round robin manner to equalize the loading of the packet duplicators in the packet duplicator bank 103.

In addition, the central controller 101 determines the approximate location of each target communication unit 111–113 by paging each communication unit 111–113 from one or more base sites. Upon receipt of a page, a target communication unit (e.g., 112) transmits an acknowledgment of the page to a base site (e.g., 107) serving the service coverage area 117 containing the responding communication unit 112. The base site 107 receiving the acknowledgment forwards the acknowledgment and the base site identification to the central controller 101. By knowing which base site received a particular communication unit's page acknowledgment, the central controller 101 knows which service coverage area the particular communication unit is most likely in and, therefore, the particular communication unit's approximate location.

Once the central controller 101 has identified the base sites 105–108 serving the communication units 110–113 involved in the requested communication, the central controller 101 determines whether the base sites 105–108 have available traffic communication channels 120–123 to support the communication. When a traffic channel is available at each participating base site 105–108, the central controller 101 instructs each participating base site 105–108 to allocate a traffic channel 120–123 for the communication. The base sites 105–108 then notify the communication units 110–113 of their respective channel assignments and the communication system 100 is ready for the transmission of the communication.

Upon being allocated a traffic channel 120, the requesting communication unit 110 transmits a communication (e.g., a voice communication) to its serving base site 105 via the allocated traffic channel 120. The serving base site 105 then forwards the voice communication to the assigned packet duplicator in the packet duplicator bank 103. The packet duplicator replicates the voice communication and provides the replicated communication to the other participating base sites 106–108 via the respective transmission links 126–128 connecting the packet duplicator to the base sites 106–108. Upon receiving the replicated communication, the base sites 106–108 transmit the replicated communication to their respective communication units 111–113 via the allocated traffic channels 121–123. The conveyance of the communication between the communication units 110–113 continues in the above manner (i.e., one base site receives the communication and forwards it to the packet duplicator, where the communication is replicated and provided to the other base sites via the transmission links 125–128) for the duration of the communication. Upon termination of the communication, the central controller 101 deassigns the packet duplicator and instructs the base sites 105–108 to deallocate the traffic channels 120–123.

During each transmission that includes communication units 112 and 113, the packet duplicator must convey the replicated communication via the long transmission links 127–128. The frequent use of the long transmission links 127–128 can become very costly for the user of the requesting communication unit 110 or for the system subscriber (e.g., a fire department) subsidizing the cost of establishing communications between the communication units (e.g., between mobile radios in fire engines and ambulances). Thus, in the typical communication system 100, group communications involving communication units located a substantial distance away from the packet duplicator bank 103 are, on average, very costly. The present invention provides a technique through which shorter transmission links can be used to reduce the average cost of group communications.

Figure 2:
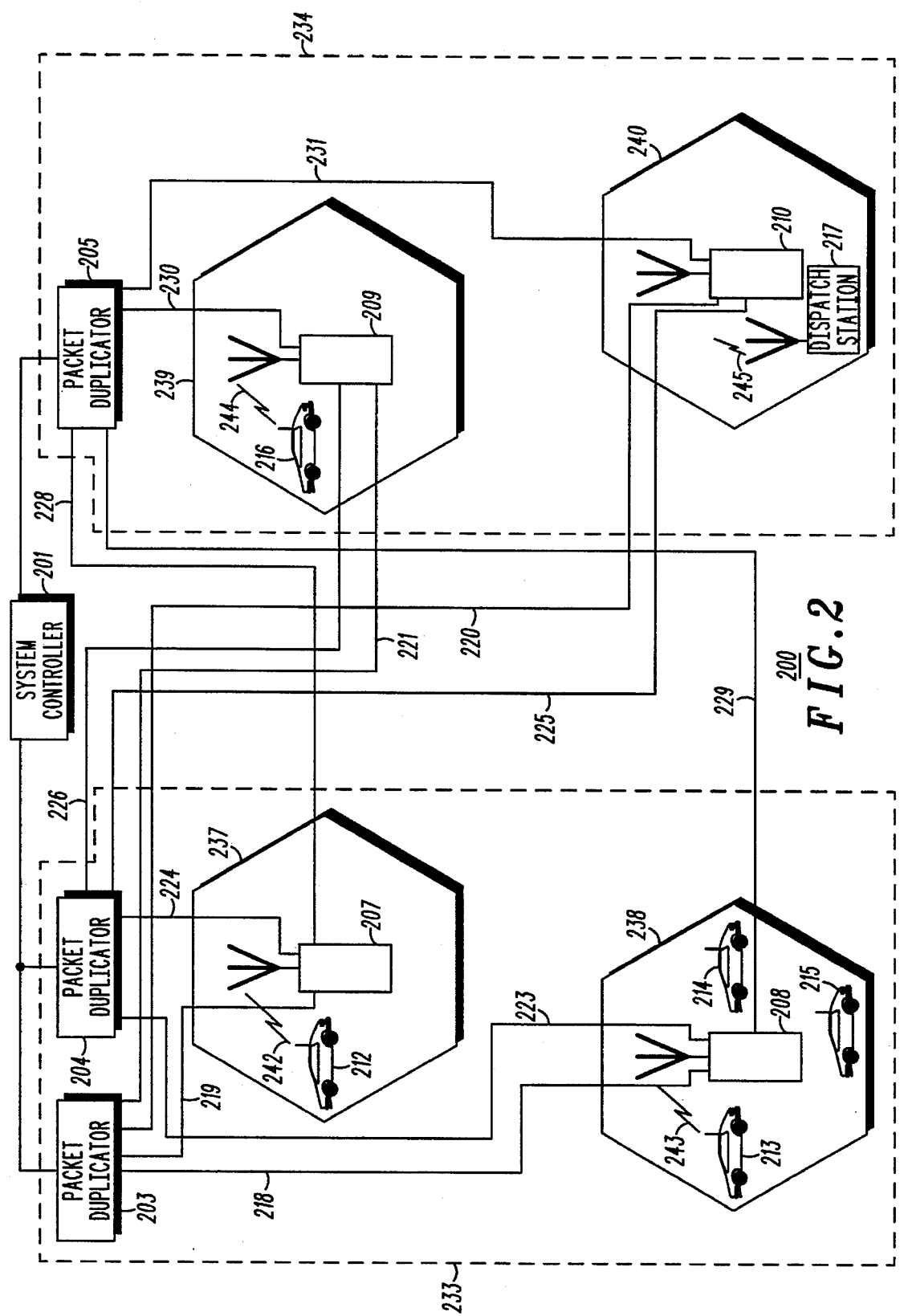
FIG. 2 illustrates a radio communication system incorporating geographically distributed packet duplicators in accordance with a preferred embodiment of the present invention.

FIG. 2 illustrates a radio communication system 200 incorporating geographically distributed packet duplicators 203–205 in accordance with a preferred embodiment of the present invention. The radio communication system 200 includes a system controller 201, a plurality of packet duplicators 203–205, a plurality of base sites 207–210, and a plurality of communication units 212–217. In this embodiment, each packet duplicator 203–205 is coupled to each base site 207–210 via a respective transmission link (e.g., packet duplicator 203 is coupled to the base sites 207–210 via links 218–221, packet duplicator 204 is coupled to the base sites 207–210 via links 223–226, and packet duplicator 205 is coupled to the base sites 207–210 via links 228–231). Each transmission link 218–221, 223–226, 228–231 preferably comprises a T1 wireline link. In a similar manner, the system controller 201 is coupled to each packet duplicator 203–205 and each base site 207–210 via a respective transmission link. The connections between the system controller 201 and the base sites 207–210 are not shown for the sake of clarity.

The system controller 201 preferably comprises an "iDEN" Dispatch Application Processor (DAP) that resides at a single location in the system 200. However, in an alternate embodiment, the system controller 201 might comprise multiple controllers distributed throughout the communication system 200. Each packet duplicator 203–205 preferably comprises an "iDEN" Packet Duplicator and, as shown, resides in a particular geographic region 233,234 of the communication system 200. Each base site 207–210 preferably comprises an "iDEN" Enhanced Base Transceiver Site (EBTS) containing an "iDEN" Access Control Gateway (ACG) and a plurality of "iDEN" Base Stations. The communication units 212–217 comprise two-way mobile radios, portable radios, or dispatch stations. The "iDEN" DAP, Packet Duplicator, ACG, and Base Stations are commercially available from Motorola, Inc.

Each base site 207–210 provides communication services to communication units located in a respective service coverage areas 237–240. For example, base site 207 provides communication services to communication units (e.g., 212) located in service coverage area 237; whereas, base site 208 provides communication services to communication units (e.g., 213–215) located in service coverage area 238. Similarly, base site 209 provides communication services to communication units (e.g., 216) located in service coverage area 239; whereas, base site 210 provides communication services to communication units (e.g., 217) located in service coverage area 240.

Each geographic region 233, 234 of the communication system 200 includes at least one packet duplicator 203–205 and at least one base site 207–210 that provides communication services to communication units located in its respective service coverage area. In the system 200 shown in FIG. 2, region 233 includes packet duplicators 203 and 204, and base sites 207 and 208, while region 234 includes packet duplicator 205 and base sites 209 and 210. In a preferred embodiment, the packet duplicator or packet duplicators for each region are positioned in each region to minimize the length of the transmission links between each packet duplicator and each base site in the region.

Operation of the radio communication system 200 occurs substantially as follows in accordance with the present invention. As described above with regard to FIG. 1, when a communication unit (e.g., 212) desires to communicate with one or more other communication units (e.g., 213–217), the communication unit 212 sends a request (i.e., a call origination request) for a communication resource, or channel, to the system controller 201 via the communication unit's serving base site 207. The request includes the identification (ID) of the requesting communication unit 212 and the ID of a target communication unit or the ID of a talk group of communication units 213–217. Before forwarding the request to the system controller 201, the base site 207 serving the requesting communication unit 212 includes its ID as part of the request.

Upon receiving the request, the system controller 201 selects a packet duplicator in support of the communication. In a preferred embodiment, the system controller 201 selects a packet duplicator serving the geographic region 233 containing the requesting communication unit 212. The system controller 201 determines the geographic region 233 containing the requesting communication unit 212 by comparing the ID of the base site 207 serving the requesting communication unit 212 to a database (not shown)—either within, or external to, the system controller 201—listing the base sites 207–210 and their respective geographic regions 233, 234. In this particular case, the system controller 201 determines that geographic region 233 contains base site 207 and, accordingly, the requesting communication unit 212. Thus, the system controller 201 selects either packet duplicator 203 or packet duplicator 204 because these two packet duplicators serve geographic region 233. In a preferred embodiment, the system controller 201 selects the packet duplicator (e.g., 203) for a particular communication in a round robin manner to equalize the loading on each packet duplicator when more than one packet duplicator serves a geographic region.

In an alternate embodiment, the system controller 201 might select the packet duplicator for a particular communication using one of a variety of criteria. For example, the system controller 201 might select the packet duplicator 205 that serves the geographic region 234 containing the dispatch station 217.

In the alternative, the system controller 201 might select the packet duplicator that serves the geographic region in which the requesting communication unit's talk group primarily resides. For example, if the requesting communication unit is a police officer for a city primarily located in geographic region 233, the system controller 201 selects either packet duplicator 203 or 204 regardless of the current location of the requesting communication unit due to the high likelihood that most talk group members will be located in geographic region 233.

In yet another embodiment, the system controller 201 might select a packet duplicator 203 that serves a geographic region 233 containing a majority of the communication units 212–217 participating in the group communication. In this case, the system controller 201 determines the approximate location of each communication unit 212–217 involved in the communication based on the IDs of the base sites 207–210 receiving the communication units' most recent (i.e., latest) registration. When a communication unit enters a new base site service coverage area or geographic region (i.e., group of base site service coverage areas), the communication unit registers with the communication system 200 by transmitting a registration message to the base site serving the coverage area in which the communication unit currently resides. Upon receiving the registration message, the base site appends its ID to the registration message and forwards both the registration message and the base site ID to the system controller 201. The system controller 201 then updates a registration database that associates the communication units with the base sites. Thus, when the system controller 201 selects the packet duplicator (e.g., 203 or 204) serving the geographic region 233 containing the majority of communication units involved in the communication, the system controller 201 first extracts the base site IDs associated with the participating communication units, then determines the geographic region of each extracted base site ID, and finally selects the packet duplicator serving the geographic region associated with the largest number of extracted base site IDs (i.e., the packet duplicator serving the geographic region containing the largest number of base sites that received the latest registrations from some or all of the participating communication units). For the system 200 shown in FIG. 2, geographic region 233 contains the majority of participating communication units 212–217. Therefore, the system controller 201 selects packet duplicator 203 or packet duplicator 204 to serve the communication in this embodiment.

By distributing the packet duplicators 203–205 throughout the communication system 200 and selecting a packet duplicator to serve the communication using any one of the above-mentioned criteria, the present invention reduces the probability that long transmission links will be used between the selected packet duplicator and the base sites providing communication services to the participating communication units. The present invention does not eliminate the possibility of using one or more long transmission links (e.g., links 220, 221, 225, and 226), but rather reduces the probability that such long links will be necessary. When long links are necessary, the present invention reduces the number of long links used during a communication, thereby reducing the average cost of communications in the communication system, as compared to prior art approaches. In addition, by utilizing a minimum number of long transmission links, the present invention reduces the average audio delay incurred between the transmitting and receiving communication units.

Upon selecting the packet duplicator (e.g., 203), the system controller 201 instructs the base sites 207–210 involved in the communication to allocate communication resources 242–245 either individually to each participating communication unit (e.g., 212, 216, 217) or to a group of participating communication units (e.g., 213–215) located in their respective service coverage areas 237–240 in support of the communication. The types of communication resources allocated depend on the multiplexing scheme utilized in the communication system 200. For example, in a frequency division multiplexed system, the allocated resources comprise predetermined bandwidth radio frequency (RF) carriers; whereas, in a time division multiplexed system, the allocated resources comprise one or more time slots of RF carriers.

Once the communication resources 242–245 have been allocated, the requesting communication unit 212 begins to transmit the communication over the allocated communication resource 242 to its serving base site 207. Upon receiving the communication, the base site 207 provides the communication to the selected packet duplicator 203 via transmission link 219. The packet duplicator 203 replicates the communication and provides the replicated communication, via transmission links 218, 220, and 221, to all the base sites 208–210 serving communication units 213–217 that are participating in the communication. The base sites 208–210 then transmit the communication to their respective communication units 213–217 via the allocated communication resources 242–245. This process continues for the duration of the requesting communication unit's transmission.

When the requesting communication unit 212 has finished its transmission, another participating communication unit may respond to the requesting communication unit 212. For example, if communication unit 213 desires to respond to communication unit 212, the responding communication unit transmits another request (a call update request) to its serving base site 208. The base site 208 then provides the call update request and its base site ID to the system controller 201. As described above, the system controller 201 determines a geographic region 233 containing the base site 208 by comparing the base site ID to a database that associates base sites and geographic regions. In a preferred embodiment, the system controller 201 then selects a packet duplicator serving the geographic region 233 of the base site 208 and, accordingly, the responding communication unit 213. In the case where the responding communication unit 213 is located in the same geographic region 233 as the requesting communication unit 212, the system controller 201 either maintains the selection of the current packet duplicator 203 or selects a new packet duplicator 204 in the region 233 to balance the packet duplicator loading. If, in an alternate embodiment, the dispatch station 217 requested to respond to the communication unit 212, the system controller 201 might select packet duplicator 205 to provide replication and distribution of the response communication. In yet another embodiment, the system controller might maintain the selection of packet duplicator 203 even if the dispatch station 217 requested to respond since the majority of participating communication units reside in the geographic region 233 served by packet duplicator 203.

Upon selecting the packet duplicator to serve the response communication, the system controller 201 instructs the base sites 207–210 to maintain their communication resource allocations. The responding communication unit (e.g., 213)

then transmits the response communication to its serving base site 208, which, in turn, provides the responding communication to the selected packet duplicator (e.g., 203) via the appropriate transmission link 218. As discussed above, the packet duplicator 203 replicates the responding communication and provides the replicated communication, via transmission links 218–221, to all the base sites 207–210 serving communication units 212–217 that are participating in the communication. It should be noted that in this case, the packet duplicator 203 provides the replicated communication back to the originating base site 208 to permit the base site 208 to transmit the responding communication to the other communication units 214–215 in the base site's service coverage area 238. The base sites 207–210 then transmit the responding communication to their respective communication units 212–217.

Figure 3:
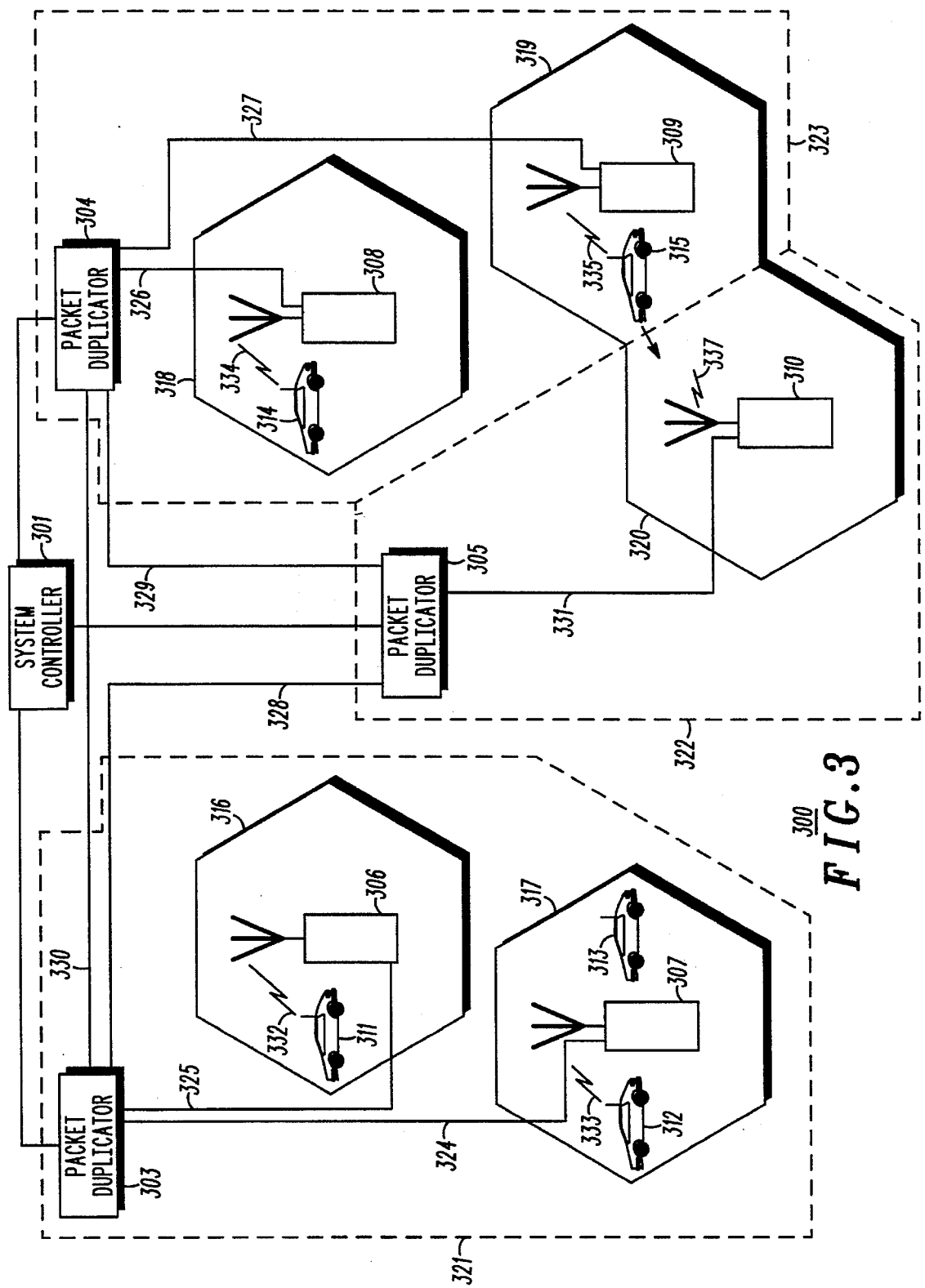
FIG. 3 illustrates a radio communication system incorporating geographically distributed packet duplicators in accordance with an alternative embodiment of the present invention.

FIG. 3 illustrates a radio communication system 300 incorporating geographically distributed packet duplicators 303–305 in accordance with an alternative embodiment of the present invention. The radio communication system 300 includes a system controller 301, a plurality of packet duplicators 303–305, a plurality of base sites 306–310, and a plurality of communication units 311–315. The system controller 301 preferably resides at a single location in the system 300. However, in an alternate embodiment, the system controller 301 might comprise multiple controllers distributed throughout the communication system 301.

Each geographic region 321–323 of the communication system 300 includes at least one packet duplicator 303–305 and at least one base site 306–310 that provides communication services to communication units located in a respective service coverage area 316–320. In the system 300 shown in FIG. 3, region 321 includes packet duplicator 303 and base sites 306 and 307, region 322 includes packet duplicator 305 and base site 310, and region 323 includes packet duplicator 304 and base sites 308 and 309. In a preferred embodiment, the packet duplicator or packet duplicators for each region are positioned in each region to minimize the length of the transmission links between each packet duplicator and each base site in the region.

In the embodiment shown in FIG. 3, each packet duplicator 303–305 is coupled to each base site in its respective geographic region 321–323 via a respective transmission link (e.g., packet duplicator 303 is coupled to base sites 306, 307 via links 324, 325, packet duplicator 304 is coupled to base sites 308, 309 via links 326, 327, and packet duplicator 305 is coupled to base site 310 via link 331). In addition, each packet duplicator 303–305 is coupled to each other packet duplicator 303–305 via a respective transmission link 328–330, such as a T1 wireline link or a microwave wireless link. The system controller 301 is coupled to each packet duplicator 303–305 and each base site 306–310 via a respective transmission link, although the connections to each base site 306–310 are not shown for the sake of clarity.

Operation of the radio communication system 300 occurs substantially as follows in accordance with the present invention. When a communication unit (e.g., 315) desires to communicate with one or more other communication units (e.g., 311–314), the communication unit 315 sends a call origination request for a communication resource, or channel, to the system controller 301 via the communication unit's serving base site 309. The request includes the ID of the requesting communication unit 315 and the ID of a target communication unit or the ID of a talk group of communication units 311–314. Before forwarding the request to the system controller 301, the base site 309 serving the requesting communication unit 315 includes its ID with the request.

Upon receiving the request and the base site's ID, the system controller 301 selects a packet duplicator in support of the communication. In this embodiment, the system controller 301 selects a packet duplicator 304 serving the geographic region 323 containing the requesting communication unit 315. The system controller 301 determines the geographic region 323 containing the requesting communication unit 315 by comparing the ID of the base site 309 serving the requesting communication unit 315 to a database (not shown) listing the base sites 306–310 and their respective geographic regions 321–323. In this particular case, the system controller 301 determines that geographic region 323 contains base site 309 and, accordingly, the requesting communication unit 315. Thus, the system controller 301 selects packet duplicator 304 to serve the communication.

Upon selecting the packet duplicator 304, the system controller 301 instructs the base sites 306–310 involved in the communication to allocate communication resources 332–335 either individually to each participating communication unit (e.g., 311, 314, 315) or to a group of participating communication units (e.g., 312, 313) in support of the communication. Once the communication resources 332–335 have been allocated, the requesting communication unit 315 begins to transmit the communication over its allocated communication resource 335 to the serving base site 309. Upon receiving the communication, the base site 309 provides the communication to the selected packet duplicator 304 via transmission link 327. The packet duplicator 304 replicates the communication and provides the replicated communication to the other base sites (e.g., 308) in its geographic region 323 via corresponding transmission links (e.g., 326) and to every other packet duplicator (e.g., 303) serving another participating communication unit. Upon receiving the replicated communication from the originating communication unit's packet duplicator 304, each target communication unit's packet duplicator 303 replicates the communication and provides the communication to each base site 306, 307 in its geographic region 321. The base sites 306–309 then transmit the communication to their respective communication units 311–315 via the allocated communication resources 332–335. This process continues for the duration of the requesting communication unit's transmission.

By coupling each packet duplicator 303–305 to the base sites 306–310 in their respective geographic regions 321–323 and to each other geographically distributed packet duplicator 303–305, the present invention permits, on average, more short, lower cost transmission links to be utilized during a particular communication than long, higher cost transmission links. This advantage results because the only long transmission links in the system 300 are those transmission links 328–330 interconnecting the packet duplicators 303–305. Thus, for each communication that needs to be conveyed between base sites in different geographic regions, only one long link per distinct geographic region is necessary to communicate with target communication units in the other geographic regions, even if the target communication units are being served by multiple base sites in the geographic regions. By contrast, the prior art's use of a centralized packet duplicator bank typically results in the use of multiple long transmission links in each geographic region since a long transmission link must be used to convey the communication to each communication unit located a substantial distance away from the packet duplicator bank.

In the event that the transmitting communication unit 315 travels into another geographic region 322 during the communication, the system controller 301 preferably detects such movement and selects another packet duplicator 305 to support the continuation of the communication, thereby maintaining utilization of a maximum number of short transmission links. In accordance with known handoff techniques, the base site 309 currently serving the mobile transmitting communication unit 315 informs the system controller 301 of the communication unit's need to be handed off from the serving base site 309 to a target base site 310. The system controller 301 then informs the target base site 310 of the upcoming handoff and instructs the target base site 310 to allocate a communication resource 337 in support of the handoff. When the communication unit 315 moves into the service coverage area 320 of the target base site 310, the system controller 301 instructs the target base site 310 to begin supporting the ongoing communication and selects a new packet duplicator (e.g., 305), if necessary, to serve the communication. The system controller 301 preferably selects a new packet duplicator 305 when the communication unit 315 moves into a service coverage area 320 of a geographic region 322 that does not contain the presently selected packet duplicator 304. By selecting a new packet duplicator 305 when the transmitting communication unit 315 moves into another geographic region 322, the present invention utilizes a maximum number of short length transmission links 324, 325, 326, 327, 331 and a minimum number of long length transmission links 328–330 during the communication to minimize the average cost of communications in the communication system 300.

Figure 4:
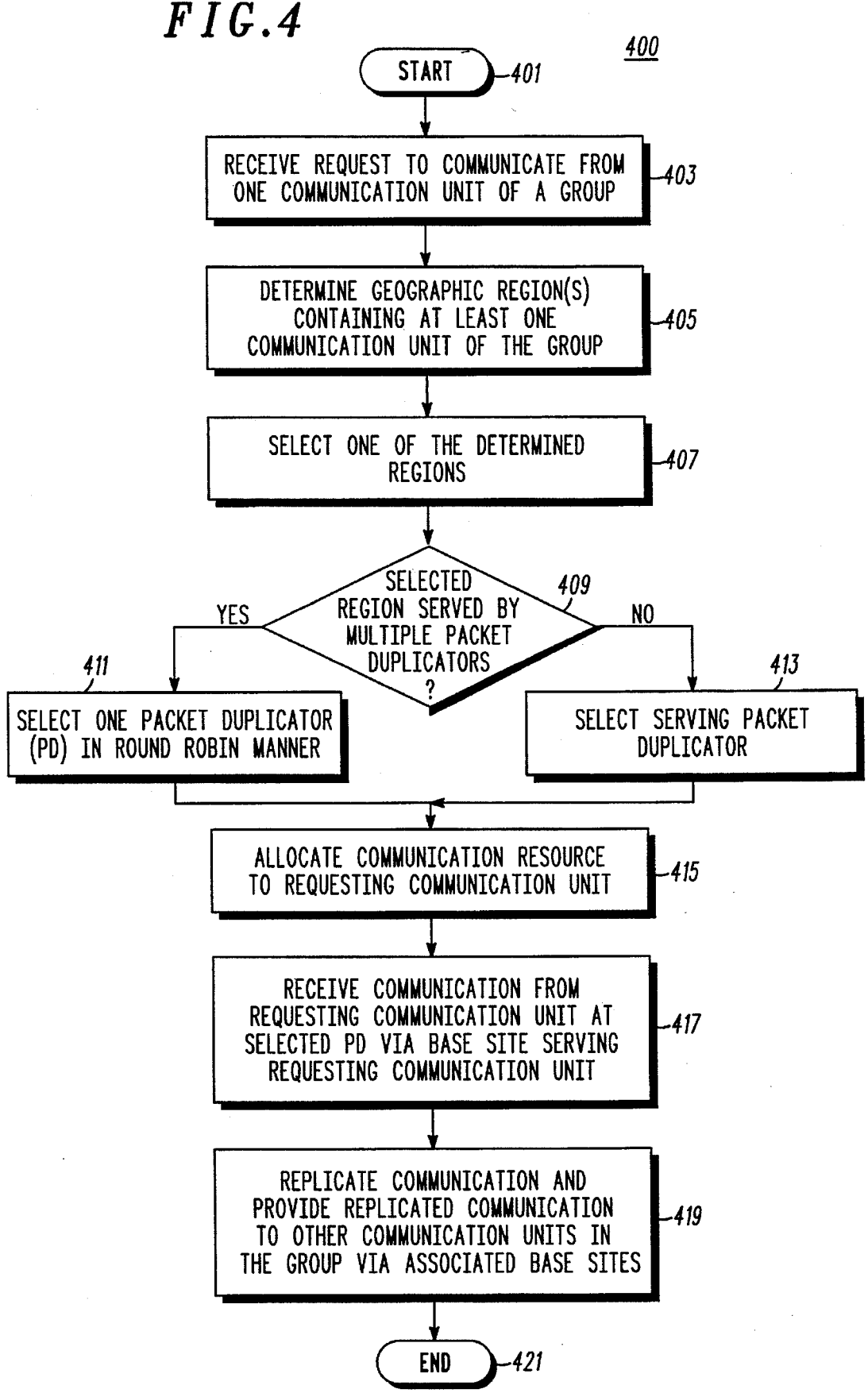
FIG. 4 illustrates a logic flow diagram of steps executed to establish a communication between communication units in accordance with a preferred embodiment of the present invention.

FIG. 4 illustrates a logic flow diagram 400 of steps executed to establish a communication between communication units in accordance with a preferred embodiment of the present invention. The logic flow begins (401) when the system controller receives (403) a request to communicate from one communication unit of a group of communication units. The group of communication units comprises two or more communication units (i.e., the requesting communication unit and at least one other communication unit). The request preferably includes an ID of the requesting communication unit, an ID of a target communication unit or talk group, and an ID of the base site that received the requesting communication unit's wireless transmission. Upon receiving the request, the system controller determines (405) the geographic region or regions containing at least one communication unit of the group. As described above, this determination preferably comprises querying a database to determine the base sites affiliated with each communication unit in the group and the geographic region or regions within which each base site resides.

Once the system controller determines the geographic region or regions containing the group of communication units, the system controller selects (407) one of the determined geographic regions (preferably the region containing the requesting communication unit) and determines (409) whether the selected region is served by multiple packet duplicators. When the selected region is served by multiple packet duplicators, the system controller preferably selects (411) one of the packet duplicators in a round robin manner to serve the requested communication. When, on the other hand, the selected region is served by only one packet duplicator, the system controller selects (413) the one packet duplicator to serve the requested communication.

Upon selecting a packet duplicator, the system controller allocates (415), or instructs the base sites serving the group of communication units to allocate, communication resources to the requesting communication unit and the other communication units in the group in support of the upcoming communication. Upon being allocated a communication resource, the requesting communication unit transmits the communication to its serving base site. The selected packet duplicator then receives (417) the communication from the requesting communication unit's serving base site, replicates (419) the communication, and provides (419) the replicated communication to the other communication units in the group via their associated base sites, thereby ending (421) the logic flow.

FIG. 5 illustrates a logic flow diagram 500 of steps executed to establish a communication between communication units in accordance with an alternative embodiment of the present invention. The logic flow begins (501) when a first base site receives (503) a request to communicate (e.g., a call origination request or a call update request) from one communication unit of a group of two or more communication units. The first base site provides (505) the request and its base site ID to the system controller. The system controller then determines (507) a geographic region of the communication system that contains the first base and, accordingly, the requesting communication unit by referencing a database as described above.

Upon determining the geographic region containing the first base site, the system controller selects (509) a packet duplicator located in, and serving, the determined geographic region. If more than one packet duplicator serves the geographic region, the system controller might select the appropriate packet duplicator as the next packet duplicator to be selected in a round robin manner. The system controller then determines (511) whether another communication unit of the group is being served by a base site that is not located in the geographic region of the first base site and the selected packet duplicator. When one or more communication units reside in geographic regions other than the geographic region containing the first base site, the system controller selects (513) one packet duplicator located in, and serving, each geographic region containing at least one communication unit of the group.

Once the appropriate number of packet duplicators are selected, the system controller uses (515) the selected packet duplicators to establish communications between the requesting communication unit and the other communication units in the group. As described above with regard to FIG. 3, the packet duplicator serving the first base site receives the communication from the first base site, replicates the communication, and routes the communication to the other participating base sites in its geographic region and to the other selected packet duplicators. The other packet duplicators then provide the replicated communication to the communication units in their respective geographic regions via corresponding base sites. Upon completion of the communication from the requesting communication unit to the other communication units in the group, the logic flow ends (517). In a preferred embodiment, the logic flow repeats for every call request, whether origination or update, thereby potentially resulting in a newly selected packet duplicator for each communication unit's transmission.

The present invention encompasses a method and system for establishing a communication between communication units using geographically distributed packet duplicators. With this invention, a maximum number of short transmission links and a minimum number of long transmission links between the packet duplicators and the base sites of the system are utilized to support communications between a group of communication units. By selecting packet duplicators based on the geographic locations of the communication units, the present invention utilizes more short links than long links, thereby reducing the average cost of communications in the system as compared to prior art systems that utilize a centralized bank of packet duplicators. Further, by utilizing multiple packet duplicators to establish the communication in accordance with an alternate embodiment of the present invention, the present invention substantially reduces the number of transmission links in the system because each packet duplicator need only be connected to each base site in its geographic region and each other packet duplicator, as opposed to being connected to every base site in the system. Still further, by utilizing a maximum number of short transmission links, the present invention reduces the average audio delay incurred between the transmitting and receiving communication units.

While the present invention has been particularly shown and described with reference to particular embodiments thereof, it will be understood by those skilled in the art that various changes in form and details may be made therein without departing from the spirit and scope of the present invention.

We claim:

1. In a radio communication system including a system controller, a plurality of packet duplicators, a plurality of base sites, and a plurality of communication units, the plurality of packet duplicators being distributed throughout geographic regions of the radio communication system such that at least one of the plurality of packet duplicators serves each geographic region, the plurality of packet duplicators providing interconnectivity between the plurality of base sites, a method for establishing a communication between a group of the plurality of communication units, the method comprising the steps of:

a) receiving, at the system controller, a request to communicate from a first communication unit of the group;

b) responsive to the request, selecting a packet duplicator that serves a geographic region containing at least one communication unit of the group to produce a selected packet duplicator; and c) using the selected packet duplicator to establish the communication.

2. The method of claim 1, wherein step (a) comprises the steps of:

a1) receiving, at a first base site of the plurality of base sites, the request to communicate, the first base site being located in a geographic region containing the first communication unit; and a2) providing the request and an identification of the first base site to the system controller.

3. The method of claim 2, wherein step (b) comprises the steps of:

b1) determining, by the system controller, a geographic region containing the first base site based on the identification of the first base site; and b2) selecting a packet duplicator that serves the geographic region containing the first base site to produce the selected packet duplicator.

4. The method of claim 3, wherein step (b2) comprises the step of:

b2a) selecting one packet duplicator of at least two packet duplicators that serve the geographic region containing the first base site.

5. The method of claim 4, wherein step (b2a) comprises the step of selecting the one packet duplicator of the at least two packet duplicators in a round robin manner.

6. The method of claim 3, further comprising the steps of:

d) allocating, by the system controller, a communication resource to the first communication unit to produce an allocated communication resource;

e) receiving, at the first base site, the communication from the first communication unit via the allocated communication resource;

f) determining, by the system controller, whether the first communication unit moves into a second geographic region during the communication; and g) when the first communication unit moves into the second geographic region, selecting, by the system controller, an alternate packet duplicator that serves the second geographic region to establish the communication.

7. The method of claim 3, wherein step (c) comprises the steps of:

c1) allocating, by the system controller, a communication resource to the first communication unit to produce an allocated communication resource;

c2) receiving, at the first base site, the communication from the first communication unit via the allocated communication resource;

c3) providing the communication to the selected packet duplicator;

c4) replicating, by the packet duplicator, the communication to produce a replicated communication;

c5) providing, by the packet duplicator, the replicated communication to a second base site of the plurality of base sites located in a geographic region containing a second communication unit of the group; and c6) transmitting, by the second base site, the replicated communication to the second communication unit.

8. The method of claim 7, further comprising the steps of:

d) receiving, at the second base site, a call update request from the second communication unit, the call update request being a request to transmit a response to the replicated communication;

e) determining a geographic region containing the second base site;

f) selecting a packet duplicator that serves the geographic region containing the second base site to produce a second selected packet duplicator; and g) using the second selected packet duplicator to provide the response from the second communication unit to the first communication unit.

9. The method of claim 1, wherein the request comprises a call origination request.

10. The method of claim 1, wherein the request comprises a call update request.

11. The method of claim 1, wherein the first group of the plurality of communication units includes a dispatch station and wherein step (b) comprises the step of selecting a packet duplicator that serves a geographic region containing the dispatch station.

12. The method of claim 1, wherein step (b) comprises the step of:

b1) selecting, a packet duplicator that serves a geographic region containing a majority of communication units in the group.

13. The method of claim 12, wherein step (b) further comprises the steps of:

prior to the step of selecting, b2) receiving, at base sites serving communication units in the group, registration messages from the communication units in the group to produce received registration messages;

b3) providing the received registration messages and identifications of the base sites serving the communication units in the group to the system controller; and b4) determining, by the system controller, the geographic region containing the majority of communication units in the group based on the received registration messages and the identifications of the base sites serving the communication units in the group.

14. The method of claim 1, wherein the group of the plurality of communication units reside primarily in a first geographic region and wherein step (b) comprises the step of selecting a packet duplicator that serves the first geographic region.

15. In a radio communication system that includes a system controller, a plurality of packet duplicators, a plurality of base sites, and a plurality of communication units, the plurality of packet duplicators being distributed throughout geographic regions of the radio communication system such that at least one of the plurality of packet duplicators serves each geographic region, the plurality of packet duplicators providing interconnectivity between the plurality of base sites, a method for establishing a communication between a group of the plurality of communication units, the method comprising the steps of:

a) receiving, at a first base site of the plurality of base sites, a call origination request from a first communication unit of the group;

b) providing, by the first base site, the call origination request and an identification of the first base site to the system controller;

c) determining, by the system controller, a geographic region containing the first base site based on the identification of the first base site;

d) selecting, by the system controller, a packet duplicator that serves the geographic region containing the first base site to produce a selected packet duplicator; and e) using the selected packet duplicator to establish the communication.

16. The method of claim 15, wherein step (e) comprises the steps of:

e1) allocating, by the system controller, a communication resource to the first communication unit to produce an allocated communication resource;

e2) receiving, at the first base site, the communication from the first communication unit via the allocated communication resource;

e3) providing the communication to the selected packet duplicator;

e4) replicating, by the selected packet duplicator, the communication to produce a replicated communication;

e5) providing the replicated communication to a second base site of the plurality of base sites located in a geographic region containing a second communication unit of the group; and e6) transmitting, by the second base site, the replicated communication to the second communication unit.

17. The method of claim 16, further comprising the steps of:

f) receiving, at the second base site, a call update request from the second communication unit, the call update request being a request to transmit a response to the replicated communication;

g) providing, by the second base site, the call update request and an identification of the second base site to the system controller;

h) determining, by the system controller, a geographic region containing the second base site based on the identification of the second base site;

i) selecting, by the system controller, a packet duplicator that serves the geographic region containing the second base site to produce a second selected packet duplicator; and j) using the second selected packet duplicator to provide the response from the second communication unit to the first communication unit.

18. In a radio communication system including a system controller, a plurality of packet duplicators, a plurality of base sites, and a plurality of communication units, the plurality of packet duplicators being distributed throughout geographic regions of the radio communication system such that at least one of the plurality of packet duplicators serves each geographic region, each of the plurality of packet duplicators being coupled to at least one associated base site and at least one other packet duplicator located in a distinct geographic region, a method for establishing a communication between a group of the plurality of communication units, the method comprising the steps of:

a) receiving, at a first base site of the plurality of base sites, a request to communicate from a first communication unit of the group;

b) determining a first geographic region of the first base site;

c) selecting a first packet duplicator that serves the first geographic region;

d) determining whether a second communication unit of the group is served by a second base site in a second geographic region;

e) when the second communication unit is served by the second base site in the second geographic region, selecting a second packet duplicator that serves the second geographic region; and f) using the first packet duplicator and the second packet duplicator to establish the communication.

19. The method of claim 18, wherein step (f) comprises the steps of:

f1) receiving, at the first packet duplicator, a communication from the first communication unit;

f2) replicating, by the first packet duplicator, the communication to produce a replicated communication; and f3) when the second packet duplicator is selected, providing, by the first packet duplicator, the replicated communication to the second packet duplicator.

20. The method of claim 19, wherein step (f) further comprises the steps of:

f4) providing, by the first packet duplicator, the replicated communication to the first base site and a third base site located in the first geographic region; and f5) providing, by the second packet duplicator, the replicated communication to the second base site.

21. The method of claim 18, further comprising the steps of:

g) determining, by the system controller, whether the first communication unit moves into a third geographic region during the communication;

h) when the first communication unit moves into the third geographic region, selecting, by the system controller, a third packet duplicator that serves the third geographic region; and i) using the second packet duplicator and the third packet duplicator to continue the communication.

22. A radio communication system comprising:

a plurality of base sites, each of the plurality of base sites providing communication services to a respective base site service coverage area;

a plurality of packet duplicators, each of the plurality of packet duplicators being coupled to each of the plurality of base sites, the plurality of packet duplicators providing interconnectivity between the plurality of base sites and being distributed throughout geographic regions of the radio communication system such that at least one of the plurality of packet duplicators serves each geographic region, each geographic region including at least one base site service coverage area; and a system controller, coupled to each of the plurality of packet duplicators, that selects a packet duplicator of the plurality of packet duplicators serving a geographic region containing at least one of a plurality of communication units to establish a communication between the plurality of communication units upon receipt of a request to communicate from one of the plurality of communication units.

23. The radio communication system of claim 22, wherein each geographic region of the radio communication system includes a plurality of base site service coverage areas.

24. The radio communication system of claim 22, wherein the plurality of communication units include a dispatch station.

25. A radio communication system comprising:

a plurality of base sites, each of the plurality of base sites providing communication services to a respective base site service coverage area;

a plurality of packet duplicators that provide interconnectivity between the plurality of base sites, the plurality of packet duplicators being distributed throughout geographic regions of the radio communication system such that at least one of the plurality of packet duplicators serves each geographic region, each geographic region including at least one base site service coverage area, each packet duplicator being coupled to at least one packet duplicator serving a geographic region not served by the each packet duplicator and to each base site located in a geographic region served by the each packet duplicator; and a system controller, coupled to each of the plurality of packet duplicators, that selects at least one packet duplicator of the plurality of packet duplicators serving a geographic region containing at least one of a plurality of communication units to establish a communication between the plurality of communication units upon receipt of a request to communicate from one of the plurality of communication units.

\* \* \* \* \*